Aug. 19, 1958
W. H. JACKSON
2,847,686
PORTABLE THREADING TOOL FOR THREADING OPPOSITE ENDS
OF A BLANK IN A SINGLE OPERATION
Filed July 19, 1956
2 Sheets-Sheet 1
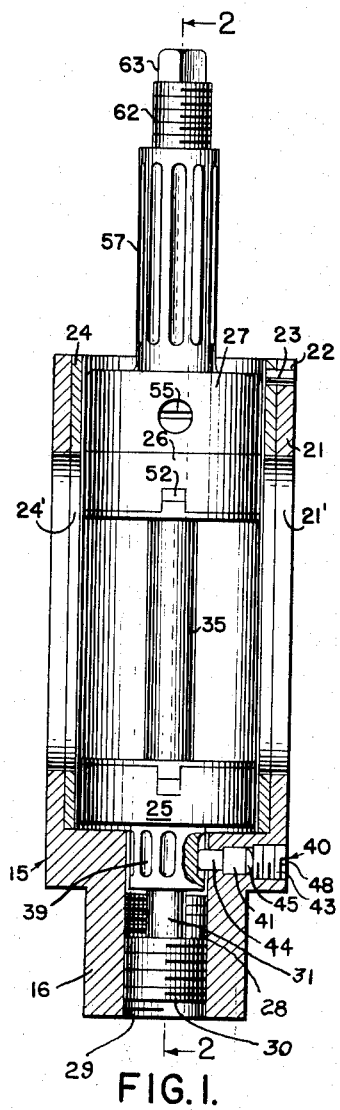
FIG. 1.
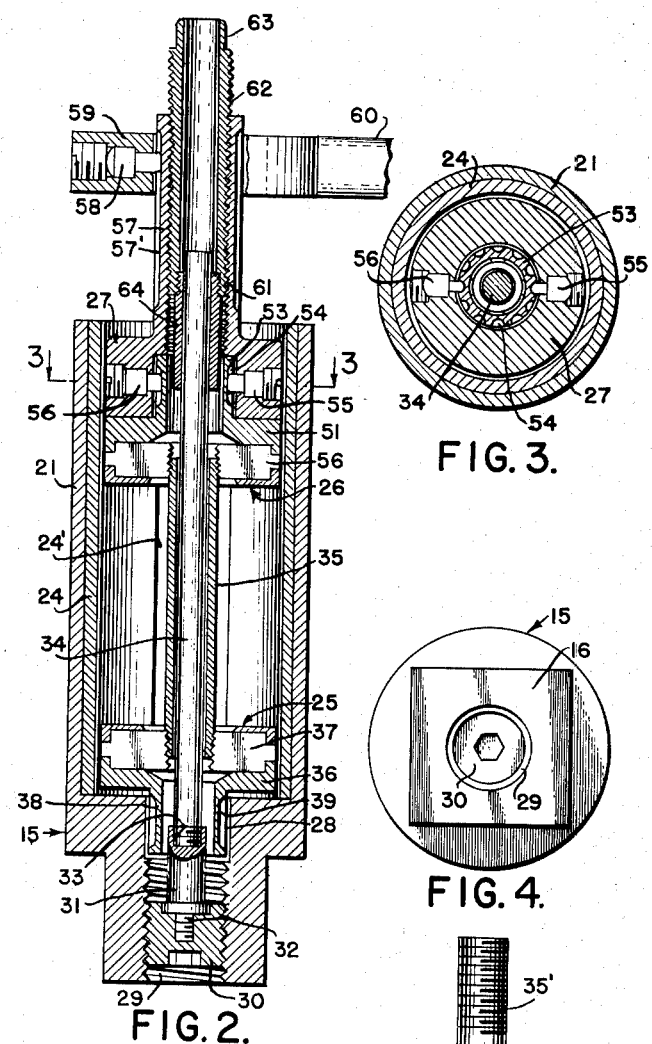
FIG. 2.
FIG. 3.
FIG. 4.
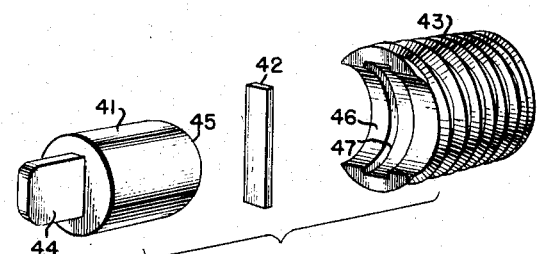
FIG. 5.
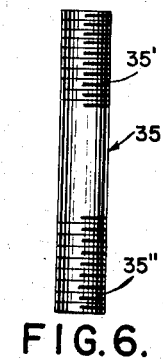
FIG. 6.
INVENTOR.
Walter H. Jackson
BY
*L. S. Saulsbury*
ATTORNEY Aug. 19, 1958 W. H. JACKSON 2,847,686
PORTABLE THREADING TOOL FOR THREADING OPPOSITE ENDS
OF A BLANK IN A SINGLE OPERATION
Filed July 19, 1956 2 Sheets-Sheet 2
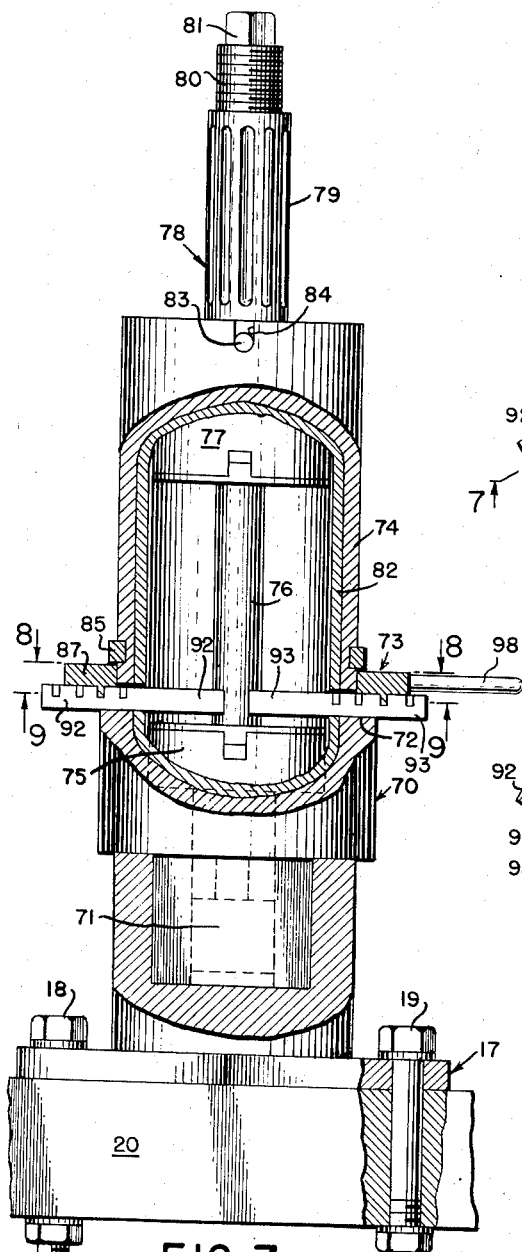
FIG. 7.
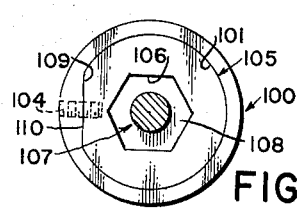
FIG. 10.
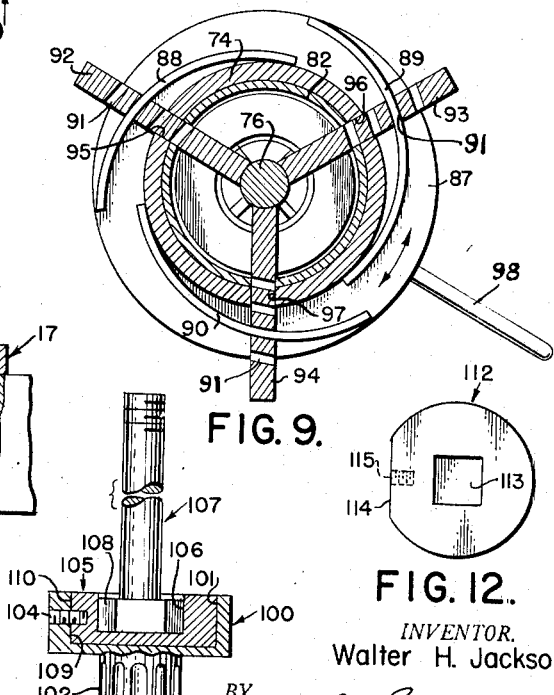
FIG. 8.
FIG. 9.
FIG. 11.
FIG. 12.
INVENTOR.
Walter H. Jackson
BY
L. S. Saulsbury
ATTORNEY

United States Patent Office 2,847,686
Patented Aug. 19, 1958

2,847,686

PORTABLE THREADING TOOL FOR THREADING OPPOSITE ENDS OF A BLANK IN A SINGLE OPERATION

Walter H. Jackson, Brooklyn, N. Y.

Application July 19, 1956, Serial No. 598,793

8 Claims. (Cl. 10—92)

This invention relates to a portable tool for threading pipe nipples, studs, bolts, screws and the like.

It is the principal object of the present invention to provide a tool for threading in a single operation both ends of pipe nipples or studs.

It is another object of the invention to provide a threading tool wherein both ends of a nipple or stud may be threaded in one operation, that employs standard fixed type die tool head assemblies.

It is still another object of the invention to provide a threading tool in which the holder part is in the form of a sleeve or cylinder and which may be held either in a fixed position in a vise or bench socket holder for hand operation or can be used with a lathe or other power turning device for machine operation, and wherein the sleeve or cylinder serves as the aligning guide for the threading dies and carrier.

It is a further object of the invention to provide in a pipe nipple threading tool which has a guide in the form of a central rod that passes upwardly inside the pipe nipple stock and holds the nipple stock piece against lateral displacement and in proper position for accurate threading by the die assemblies and wherein the guide rod is supported on an adjustable stop member which is adjustable to limit the length of the thread on one end of the pipe nipple to the desired extent and wherein the upper end of the rod passes through an adjustable guide and stop bushing device on the carrier to limit the length of thread on the other end of the pipe nipple carrier wherein provision is made to permit the replacement of one rod and its guide bushing at the upper end by another rod and its guide bushing of another size so that the tool is adapted for different size diameter nipples.

It is still another object of the invention to provide in a tool for threading pipe nipples, bolts, studs and the like a flat spring loaded detent device for holding the die assembly against rotation in the cylindrical holder and so as to provide easy insertion of the die assembly into the holder opening and its removal therefrom without requiring manual release and a similar detent for use on the carrier that supports the rotatable die on the upper end of the tool and for connecting the wrench to the die carrier shank.

It is a further object of the invention to provide in a portable threading tool a sleeve liner of various wall thicknesses, which can be placed in the cylindrical body, in order to adapt the tool for different diameters of the die assemblies bearing the different size cutting elements.

It is a still further object of the invention to provide an external guide device for threading tools that will engage the exterior of the stock piece so as to insure the proper starting of the lower end of the pipe nipple or stud stock piece which is adjustable for different diameters of pipes or stud stock which is adapted to be quickly closed and readily opened as soon as the stock piece has become centered in the bottom die assembly and which can be completely retracted into the sleeve walls so as to permit the full downward passage of the movable die for the making of close nipples and studs with threads extending to the center of the nipple or stud and wherein the external guide device can be completely removed as a unit from the tool assembly after removal of a spring retaining ring that normally holds it in place upon the cylindrical body.

It is a still further object of the invention to provide a portable tool for threading pipe nipples, studs, bolts and the like which can be readily converted from a tool adapted to thread pipe nipples or studs to a tool adapted to thread headed bolt pieces simply by replacing the bottom die with an assembly adapted to receive and retain the bolt head while the upper die is used to thread the bolt, the assembly being adjustable to different size and shape of bolt heads.

Other objects of the invention are to provide a portable tool for threading pipe nipples, studs, bolts and the like, having the above objects in mind, which is of simple construction, is inexpensive to manufacture, has a minimum number of parts, easy to assemble, durable, light in weight, can be carried by the mechanic in his tool kit, efficient and effective in use.

For other objects, and for a better understanding of the invention, reference may be had to the following detailed description taken in connection with the accompanying drawing, in which Figure 1 is a vertical sectional view of the cylindrical body holder of the portable threading tool constructed according to one form of the invention, and the standard die assemblies, movable die carrier and pipe nipple being shown in full, Fig. 2 is a full vertical sectional view of the threading tool taken through the die assemblies, movable die carrier and nipple as viewed on line 2—2 of Fig. 1, Fig. 3 is a transverse sectional view of the threading tool taken through the upper die assembly carrier and showing in full the detent retaining devices for the detachable connection of the carrier with the upper die assembly, as viewed on line 3—3 of Fig. 2, Fig. 4 is a bottom plan view of the threading tool looking upon the squared lower end adapted for retaining the tool in a vise or socket having a square opening, whereby the body of the tool will be held against turning movement while the thread ends are being cut upon the nipple, Fig. 5 is a collective and perspective view of the parts of the flat spring detent retaining device that is used to hold the lower die assembly in the tool cylinder body, the upper die assembly in the carrier and the turning wrench upon the shank portion of the die assembly carrier, so as to hold the die assemblies against rotation relative to the tool holder body and the carrier, the wrench upon the carrier, and yet permitting their axial assembly upon one another or removal therefrom, Fig. 6 is an elevational view of the completely threaded nipple removed from the tool, Fig. 7 is an elevational view of the nipple and stud threading tool constructed according to another form of the invention in which the die assemblies are arranged for threading a short stud and which has an external retractable centering work device for holding the stud while it is being started in the lower die assembly with portions of the tool being broken away to show the interior of the tool and tool being mounted on a socket holder fixed to a bench and the tool being made ready for use, Fig. 8 is a transverse sectional view of the latter threading tool looking downwardly upon the external work centering device and as viewed on lines 8—8 of Fig. 7, and Fig. 9 is a transverse sectional view taken through the threading tool and the external work centering device, the view being taken on line 9—9 of Fig. 7, Fig. 10 is a top plan view of a holder for a bolt head adapted to replace the lower die 75 in the body 74, Fig. 11 is an elevational view of the bolt holder shown in Fig. 10 with portions broken away to show the interior construction thereof, and Fig. 12 is a plan view of an adaptor for the holder for use with square headed bolts.

Referring now particularly to Figs. 1 to 5, 15 represents the main holder body in which internal working parts of the tool are assembled. This main body has a squared bottom end portion 16 for attaching the tool to a vise or a socket holder 17, Fig. 7 having a square opening therefor. This socket holder may be fixed by bolts 18 and 19 to a bench 20.

The main holder body 15 also has an upwardly-extending cylindrical wall portion 21 with vertically-extending elongated openings 21' through which the thread cuttings can be dispensed. The cylindrical wall portion has a notch 22 in its upper end adapted to receive a pin 23 in the upper end of a sleeve liner 24 to hold the liner against rotation therein and its vertically-extending elongated slots 24' in alignment with the slots 21' in the body wall 21. This liner provides an inner wall guiding surface for lower and upper die assemblies 25 and 26 and a carrier 27 that carries the upper die assembly 26. Alternative liners 24 of different radial thicknesses can be used to adapt the tool for the different size die assemblies. The liner sleeve 24 can also be removed to accommodate the larger diameter size die assemblies. Thus, the tool can be adapted to thread different size nipples.

Extending through the main body 15 and the squared end is a central opening 28 which has a threaded portion 29. This opening 28 has an adjustable plug 30 in the threaded portion 29 into which a stop member 31 is threaded as indicated at 32. The upper end of stop member 31 has a threaded recess 33 adapted to receive the threaded lower end of a guide rod 34 onto which a nipple blank 35 is placed to be centered in the lower die assembly 25 lying in the bottom of the cylindrical wall portion 21 of the main body 15.

The lower die assembly comprises a body 36 having a plurality of thread cutting elements 37 nested therein with their cutting faces engaging the end of the nipple blank to cut the thread thereupon as the nipple blank is turned. The body 36 has a depending reduced diameter shank portion 38 that has a plurality of angularly-spaced, vertically-extending elongated recesses or indentations 39 on the exterior thereof.

A detent assembly 40 as shown in Figs. 1 and 5, is engageable with the recesses 39, is provided in the body 15 to releasably hold the lower die assembly 25 in place in the body 15 against rotation. This detent assembly 40 comprises three parts, namely, an inner plug part 41, a flat spring 42 and a threaded adjustable plug 43. The inner plug part 41 is generally of cylindrical shape and has a narrow projection 44 of rectangular section that enters opening 28 and engages any one of the recesses 38 on the depending shank portion 38. The recesses 38 and end of the projection 44 are rounded to permit easy insertion or removal of the die 25 from the body 15. The other end of the inner part 41 is round and of semi-spherical shape as indicated at 45. The threaded plug 43 has a cylindrical recess 46 in the front end face thereof conforming generally in radius to the spherical end face 45 of the part 41. Centrally of the cylindrical end recess 40 is a further recess 47 adapted to receive and guide the flat spring 42. The flat spring 42 has a tendency to be straightened and will urge the plug body 41 and its projection 44 into engagement with one of the elongated recesses 39. On the end of the screw plug 43 is a slot 48 adapted to accommodate a screw driver for effecting the adjustment of the thread plug 43 and the spring pressure.

The upper die assembly 26 is a standard die assembly and the same as the lower die assembly 25. It has a main body 51 containing cutting elements 52 in nested relationship to thread the upper end of the pipe nipple blank 35. The main body 51 of this die assembly has an upwardly-extending shank portion 53 with a plurality of angularly-spaced, vertically-extending elongated recesses 54. The upper die carrier 27 has opposing detent assemblies 55 and 56, similar to the assembly already described and shown in Fig. 4, which engage with the recesses 54 to hold the upper die assembly 26 against rotation within the carrier and against downward axial displacement therefrom.

The die carrier 27 has an elongated upstanding shank 57 that has angularly-spaced elongated recesses 57' adapted to receive a detent assembly 58 of a turning handle ring 59 that is fitted over the shank 56 and which has a handle 60 extending laterally so as to apply adequate turning torque upon the carrier 27 and the cutting action of the nipple threading die assemblies 25 and 26.

The shank portion 57 of the carrier 27 has internal threads 61 and receives an adjustable sleeve 62 having a squared wrench engaging portion 63 at its upper end. The guide rod 34 for the nipple 35 slides upwardly through the sleeve 62 as the carrier and the upper die assembly 26 is turned downwardly upon the nipple 34. Threaded into the lower end of the sleeve 62 is a stop sleeve 64 with which the end of the nipple 35 engages to limit the downward cutting action upon the nipple. The sleeve 63 and the stop sleeve 64 is adjustable to different elevations depending upon the length of thread desired upon the upper end of the nipple 35.

In order to place the nipple 35 into the device, the carrier 27 and the upper die 26 is removed and nipple blank 35 is slid downwardly over the guide rod 34 and centered in the lower die assembly 25. The upper die assembly 26 and the carrier is put into the liner sleeve 24 over the upper end of the guide rod 34 and into the liner sleeve 24 so that the die assembly 26 engages the upper end of the nipple blank 35. With the wrench 59 the carrier 27 and the upper die 26 is turned so as to start the threading action upon the opposite ends of the nipple blank 35. Once the threads have been started upon the opposite ends of the nipple blank the turning motion is continued to complete the threads on both ends of the nipple until the lower end of the stop sleeve 64 engages with the upper end of the nipple blank 35 and the upper end of the stop member 31 engages with the lower end of the nipple blank 35. Thereafter, the carrier 27 and the upper die 26 is rotated in the reverse direction until the same has been made free of the threaded nipple. Thereafter, the nipple if detached from the lower die can be removed and another nipple blank placed over the guide 34 to be threaded. If the nipple is not readily detached from the lower die 25 the lower die can be removed from the body of the tool and the nipple extracted from the die with appropriate tools. The finished nipple 35 will have threaded portions 35' and 35" on the opposite ends of the same, Fig. 6. To adapt the tool for making different size nipples different size liner sleeves 24 and die assemblies can be placed into the body 15. These die assemblies are standard threading dies. The stop member 31 and the guide rod 34 can be replaced by another stop member and another guide rod. Similarly another stop sleeve 64 can be applied to the adjustable sleeve 63.

Referring now to Figs. 7, 8 and 9, 70 represents a main holder body which has a squared end portion 71 adapted to be inserted in the holder 17. This main body 70 has a shoulder 72 for supporting an external blank nipple or stud guiding device 73 and a cylindrical wall portion 74 extending upwardly therefrom. In the lower end of the cylindrical portion is a lower die assembly 75, into which a blank stud 76 is placed. An upper die assembly 77 and its carrier 78 is placed over the stud and into the cylindrical portion. This carrier 78 has a shank portion 79 to which the wrench 59 is attached in the same manner as above described and in which there is an adjustable sleeve 80 with an adjusting wrench-engaging portion 81 adapted to adjust the sleeve for determining the length of thread to be made on the upper end of the stud. A liner sleeve 82 fitted into the cylindrical portion 74 serves as a guide for the dies. This sleeve has a pin 83 at the upper end thereof that enters a notch 84 in the upper end of the portion 74 so as to hold the sleeve against rotation as the upper die 77 is turned to thread the stud.

The external guiding device 73 is located as near to the upper face of the lower die 75 so as to permit even the shortest studs to be guided into the lower die 75. This guiding device 73 is held against upward displacement from the shoulder 72 by a spring retaining ring 85 that is seated in an annular recess on the external surface of the cylindrical portion 74.

This guide device or mechanism 73 comprises an external ring 87 that has a plurality of angularly-spaced arcuate involute portions 88, 89 and 90 adapted to fit respectively into any one of a plurality of longitudinally spaced recesses 91 of any of the radially-adjustable guide elements 92, 93 and 94 which extend through angularly-spaced openings 95, 96 and 97 in the cylindrical wall 74 and in respective registered openings of the liner sleeve 82 and are adapted to be aligned with the center of the stud 76 so that their inner curved ends may be located to center the stud in the lower die and hold the same during the initial part of threading operation.

The annular member 87 has a laterally-extending handle arm 98 which is grasped to turn the ring 87 so that as the ring is turned the guide elements 92, 93 and 94 may be either contracted or expanded. The guide elements are retracted preferably to an extent to clear the inner wall surface of the sleeves 82 so as to permit the removal of the lower die assembly 75. As soon as the stud has been started into the lower die, the guiding elements 92, 93 and 94 can be expanded. When the elements are expanded sufficiently the upper die can be moved downwardly through the liner sleeve 82 to the lower die so as to provide a close threaded nipple or stud.

Referring now particularly to Figs. 10, 11 and 12, 100 represents a holder that is adapted to replace the lower die 25 or 75 of the above described nipple cutting tools. This holder has a top recess 101 and a depending shank 102 with vertically-extending elongated recesses 103 in the external surface thereof. The holder has a set screw 104 that can be tightened upon the holder and extended into an adaptor block 105 which has an hexagonal recess 106. A bolt 107 is inverted and its head 108 is inserted in the recess 106 so that its shank extends upwardly to be engaged by the upper die assembly 26 or 77. The block 105 has a flat side 109 that is aligned with a straight side 110 of the recess 101 so that the block 105 is kept from turning while the thread is being turned upon the bolt 107. The set screw 104 will hold the block 105 against outward displacement therefrom. In Fig. 12, there is shown a block 112 adapted to similarly fit in the recess 101 and which has a screw opening 113 for receiving a squared head of a bolt. This block has a flat side 114 with a screw opening 115 therein for receiving the set screw 104.

It will be apparent that other blocks can be provided in which there are different shape and size openings for other size and shape bolt heads. With the holder 100 in place in the body of the tool and with the bolt projecting upwardly therefrom the upper die 26 or 77 can be disposed in the body of the tool and turned onto the bolt and place a thread thereon.

It should now be apparent that there has been provided a pipe nipple or stud threading tool which is adaptable for different size diameters of nipples and studs and wherein standard die assembles can be used. It will also be apparent that this tool can either be held in a vise or socket while the carrier for the upper die assembly is turned so that the machine can be readily adapted for lathe operations by connecting the holder to a fixed part of the lathe and the carrier to a rotating chuck.

While various changes may be made in the detail construction, it shall be understood that such changes shall be within the spirit and scope of the present invention as defined by the appended claims.

What is claimed is:

1. A portable tool for threading pipe nipples, stud bolts and the like comprising a hollow body having a depending shank portion adapted to be secured to a socket or vise, said hollow body being open at the top and having a central opening depending from the bottom thereof within the shank portion, a lower die assembly resting in the bottom of the hollow body and having a shank extending into the central opening, releasable means on the body engageable with the shank of the die assembly to hold the same against rotation, means associated with said body to hold a blank piece centered upon the lower die, an upper die carrier, an opposing upper die having a shank extending into the carrier, releasable means on the carrier and engaging with the shank of the upper die to hold the upper die against rotation relative thereto, and against downward displacement therefrom, said carrier and upper die adapted to be slidably fitted into the open end of the hollow body so that the die will engage the upper end of the blank piece, said carrier having an upwardly-extending shank and a turn handle associated with said shank by which the carrier, the upper die and the blank piece can be turned, whereby to effect the cutting of threads upon both ends of the blank piece.

2. A portable tool for threading nipples, stud bolts and the like as defined in claim 1, and said means for holding the blank piece centered upon the lower die and within the tool comprising a guide rod extending upwardly from the central opening in the bottom of the tool holder and through the upper die and into its carrier.

3. A portable tool for threading nipples, stud bolts and the like as defined in claim 1, said releasable means for securing the lower die in the bottom of the hollow body including recesses in said shank of said bottom die and detent means in the body engageable with said recesses of the shank of the lower die and said upper die having a shank extending into said carrier and detent means on said carrier engageable with said shank to hold the upper die in the carrier against rotational and vertical downward displacement with respect thereto, said carrier having recesses in its upwardly-extending shank portion and said turn handle having a detent releasably connecting said turn handle with said shank to engage with the shank and cause the turning of the carrier and upper die as the handle is turned.

4. A portable tool for threading nipples, stud bolts and the like as defined in claim 1, and a replaceable liner sleeve adapted to be fitted into the hollow body and means engageable therewith to lock the same against rotational adjustment therein.

5. A portable tool for threading nipples, stud bolts and the like as defined in claim 1, and said means for centering the lower end of the blank piece in the bottom die comprising an annular plate surrounding said hollow body externally thereof and having curved arcuate cam projections angularly spaced thereon and depending from the underface thereof, radially extending blank piece engaging elements radially slidable through the sides of the hollow body and adapted to engage with the blank piece to center the same in the lower die, said radially adjustable elements having grooves for receiving said cam projections and upon the ring being turned one way or the other the radial elements will be contracted or expanded into and out of engagement with the blank piece.

6. A portable tool for threading nipples, stud bolts and the like as defined in claim 1, and adjustable stop means in the central depending opening of the central body adapted to be engaged by the blank piece to limit the length of the threads on the lower end thereof and adjustable stop means on the carrier and engageable by the upper end of the blank piece to limit the length of the threads on the upper end of the piece.

7. A portable tool for threading nipples, stud bolts and the like as defined in claim 6, and said means for holding the blank piece centered including a guide rod carried on the adjustable stop means in the bottom of the hollow body and adjustable therewith within the central openings, said adjustable stop means on the carrier including a stop sleeve and said guide rod extending through the sleeve and thereby held in lateral displacement within the tool.

8. A portable tool for threading nipples, stud bolts and the like as defined in claim 7, and said central opening being threaded and said stop means including a plug threadedly adjustable in said central opening, said shank on said carrier being internally threaded, said adjustable stop means in said carrier including a threaded sleeve adjustable in the carrier shank and a stop sleeve carried by said adjustable sleeve.

No references cited.